United States Patent
Tarr

[19]

[11] Patent Number: 6,107,610
[45] Date of Patent: Aug. 22, 2000

[54] POWER FACTOR CORRECTION SYSTEM FOR A RESISTIVE LOAD DEVICE

[75] Inventor: John W. Tarr, Goodrich, Mich.

[73] Assignee: Incoe Corporation, Troy, Mich.

[21] Appl. No.: 09/095,548

[22] Filed: Jun. 11, 1998

Related U.S. Application Data

[60] Provisional application No. 60/049,867, Jun. 13, 1997.

[51] Int. Cl.[7] .................................................. H05B 1/02
[52] U.S. Cl. .......................... 219/494; 219/497; 219/501; 374/101
[58] Field of Search ..................... 219/494, 497, 219/501, 505, 216; 374/101, 102; 323/236, 237

[56] References Cited

U.S. PATENT DOCUMENTS

| | | | |
|---|---|---|---|
| 3,553,428 | 1/1971 | McGhee | 219/494 |
| 3,961,236 | 6/1976 | Redek et al. | 323/18 |
| 4,032,746 | 6/1977 | Barsell | 219/216 |
| 4,340,807 | 7/1982 | Raskin et al. | 219/497 |
| 5,142,126 | 8/1992 | Teng . | |
| 5,582,756 | 12/1996 | Koyama . | |
| 5,844,207 | 12/1998 | Allard et al. | 219/497 |

*Primary Examiner*—Mark Paschall

[57] ABSTRACT

A power factor correction system includes a sensing device in communication with a power supply to measure the line voltage on conventional service lines and detect any voltage fluxuations. A temperature controller receives power from the service lines and supplies an output voltage, based on the line voltage input, to one or more resistive loads, such as heater members. The heater members in turn are used to keep material in a molding device in a molten condition and within a certain temperature range. Fluctuations in the line voltage are detected by the sensing device which prevents corresponding changes in the voltage supplied to the resistive loads from the temperature controller.

15 Claims, 2 Drawing Sheets

POWER FACTOR CORRECTION SYSTEM FOR A RESISTIVE LOAD DEVICE

This application claims benefit of provisional 60/049,867 Jun. 13, 1997.

TECHNICAL FIELD

The present invention relates to a method and apparatus for monitoring the power output from conventional service lines and compensating for any fluctuations detected in the line voltage. More specifically, the present invention relates to a method and apparatus for monitoring the power output from conventional service lines which output is supplied to a temperature controller to compensate for any fluctuations in line voltage.

BACKGROUND ART

In conventional injection molding methods and apparatus, a material, such as plastic, is supplied to a barrel where it is heated to molten form by electric heaters or the like. The molten material is than forced under pressure by a reciprocating screw through a nozzle. The molten material passes from the nozzle through a manifold, to at least one bushing, and then into a mold cavity to form a part.

In order to injection mold consistent parts, it is important to keep the molten material heated at a constant temperature throughout the injection molding process. This is particularly true where engineering-type plastic materials are utilized which have a relatively small working temperature range.

In order to insure that the molten material remains heated to the proper temperature or within the requisite temperature range, it is important to regulate the temperature of the material at the various locations through which the molten material passes, including the manifold and bushings. If the temperature of the material fluctuates significantly, the injection molding process cannot produce consistent high quality molded parts. This will increase the number of rejected parts and waste materials.

If the molten material is heated to a higher or lower temperature than desired, its flow characteristics can change and more or less molten material may be provided to the part than required. The quality and finish of the final molded part also will be affected. Temperature fluctuations frequently occur as a result of variations in the line voltage being used to supply power to the temperature controller which in turn is used to control the heat applied to the desired areas of the molding system, including the manifold and the bushings.

In current injection molding processes, the temperatures at locations in the various components of the system are monitored by thermocouples. The measured temperature from each thermocouple is displayed on a temperature controller. If any changes in the temperature at those locations are detected, they are reflected by the thermocouples. The thermocouples send the data to the temperature controller which is set-up to adjust and correct the temperatures of the components as needed. However, if there is a delay from the time the temperature first changes to the time the thermocouple detects the temperature change and the controller can react to the change by increasing or decreasing the voltage to correct for the temperature variances. This time delay can affect the quality of the part.

Systems for monitoring a line supplying power and systems for correcting variances in the supplied power are known in the art. Examples of such systems are disclosed in U.S. Pat. Nos. 4,356,440, 4,554,502, and 4,672,298. However, these prior art systems relate to power factor corrections for voltage being applied to inductive loads, such as motors and not to resistive loads such as electric heaters and the like. Inductive loads respond differently to line voltage fluxations than do resistive loads. Thus, these systems as they relate to inductive loads do not assist in the problems of line voltage variances as they affect resistive loads.

SUMMARY OF THE INVENTION

It is an object of the present invention to provide a method, apparatus and system for improving the quality of parts produced by a molding system, particularly a plastic injection molding system. It is another object of the present invention to provide an improved method, apparatus and system for controlling and maintaining molten material such as plastic, in an injection molding system within a desired temperature range.

It is also an object of the present invention to provide a method and apparatus to more accurately regulate and control the voltage applied to any resistive load by accommodating for variances in the power supply voltage. It is still another object of the present invention to provide a method and apparatus for adjusting the output voltage supplied from a temperature controller to heat at least one portion of an injection molding system component based on variations in line voltage measured on the supply lines.

These and other objects and purposes of the present invention are met by the inventive method, apparatus and system disclosed and claimed herein. In particular, the present invention provides a power factor correction system for use with resistive loads, in particular for use with injection molding systems. The system includes a measurement device which is in communication with conventional service lines to measure the line voltage thereon. A temperature controller receives power from the service lines and supplies an output voltage, based on the line voltage input, to a portion of an injection mold to heat that portion of the mold to a certain temperature. A thermocouple measures and displays the heat provided to the portion of the injection molding system being heated by the controller.

The controller applies more or less voltage as required depending upon the temperature required as provided by the thermocouple reading. The sensing device detects the line voltage directly and transmits its value to the controller for comparison. The sensing device measures any fluctuations or changes in the line voltage and applies a signal to the temperature controller to apply a proportional change to the voltage going to the resistive loads (heaters) to ensure that a constant temperature is maintained.

Additional features and advantages of the present invention will become apparent to one of skill in the art upon consideration of the following detailed description of the present invention, when viewed in accordance with the attached drawings and appended claims.

BEST MODES FOR CARRYING OUT THE INVENTION

Figure 2:
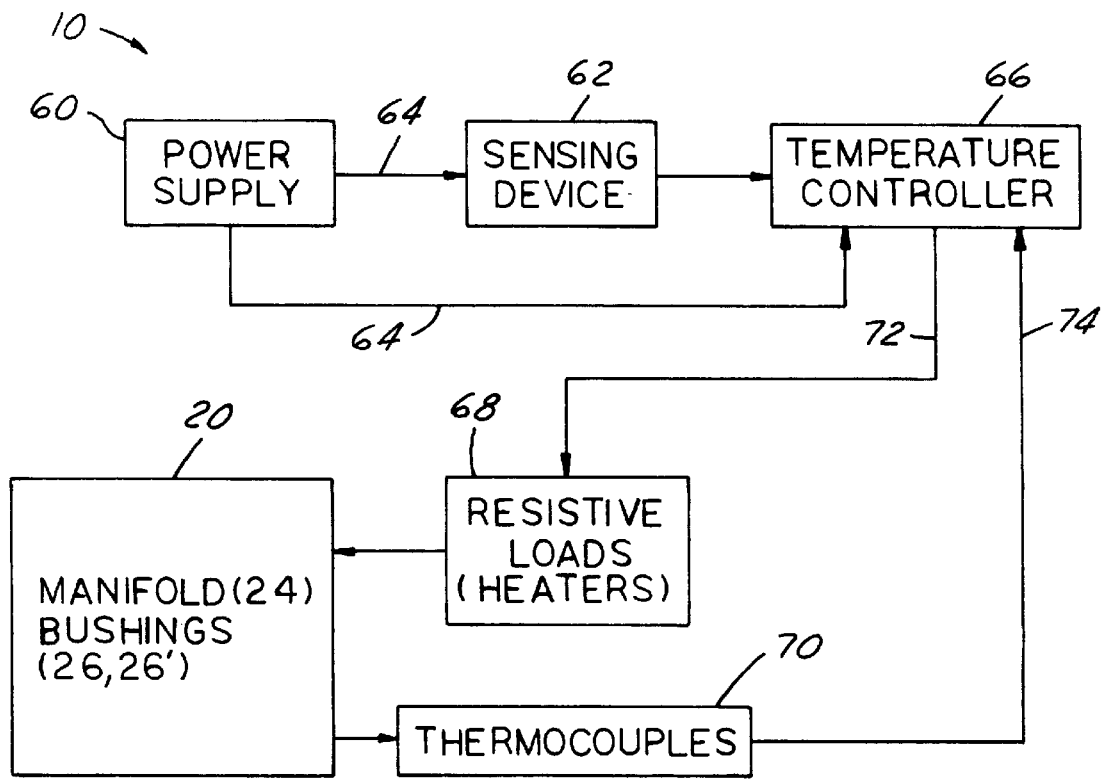
FIG. 2 is a flow chart illustrating the operation of the power factor correction system in accordance with the present invention.

The preferred embodiment of the present invention is illustrated in the flow diagram of FIG. 2 which schematically illustrates the power factor correction system and is generally referred to by the reference numeral 10. The power factor correction system 10 may be used in connection with any resistive load to compensate for line voltage fluxuations.

Figure 1:
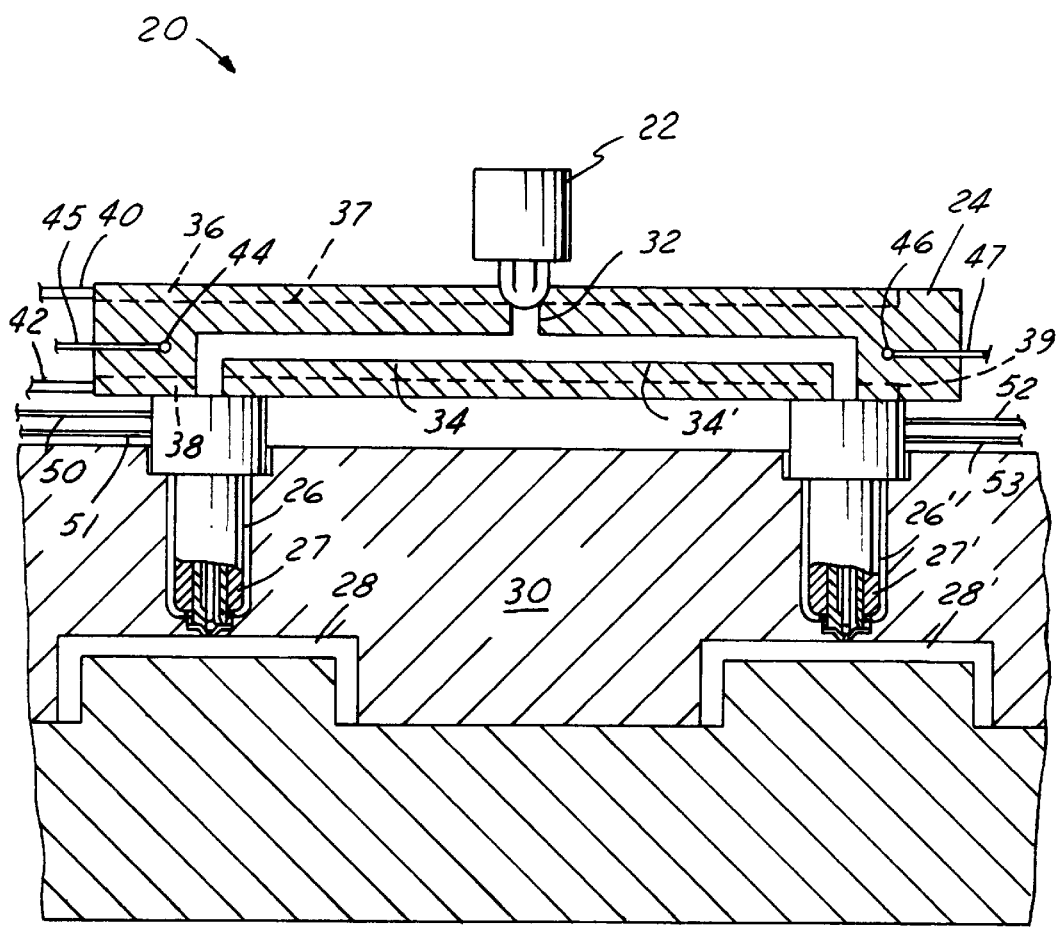
FIG. 1 is a schematic illustration of an injection molding system.

The preferred use of the present invention relates to an injection molding system, such as system 20 schematically illustrated in FIG. 1. Although the present invention will be described with respect to an injection molding system, it is to be understood that it can be utilized with any system in which a resistive load is utilized and a need exists to compensate for line voltage fluctuations. For example, the present invention can be used for systems and processes to make powdered metal products or ceramic products, and can be used for casting, as well as injection molding processes.

In a typical injection molding system 20, the molten plastic material is injected from a nozzle 22 into a manifold 24, into one or more bushings 26 and in turn into a part cavity 28 in a mold 30. As is known in injection molding systems, a large number of bushings could be utilized depending on the size of the mold cavity and final part. There could be several bushings introducing plastic material into a single cavity. Also, the manifold could have sufficient size to accommodate a large number of bushings, such as 16,32 or more.

In the representative and illustrative system 20 shown, a single manifold 24 is utilized to service a pair of bushings 26,26' and to make a pair of molded parts in cavities 28,28'. The nozzle 22 delivers the molten plastic material into a channel 32 which divides into two channels 34 and 34' in order to send the material to the two bushings. The manifold 24 is heated by a pair of conventional resistive-type tubular heater members 36 and 38 which are positioned in open channels 37 and 39, respectively, in the upper and lower surfaces of the manifold. It is also possible to use cartridge-type heater members which are preferably positioned in bores in the manifold. Wire leads 40 and 42 are attached to a temperature controller (such as temperature controller 66 shown in FIG. 2), which is powered by an appropriate power source, such as line voltage. The temperature controller regulates the voltage supplied to the heater members, and thus controls the temperatures of the heater members.

Thermocouple members 44 and 46 are positioned in bores in the manifold and measure the temperature thereof. Signals from the thermocouples are sent by wire leads 45 and 47 to the temperature controller and displayed to the operator.

The bushings 26 and 26' are heated by conventional resistant-type heater members 27 and 27', preferably coil heaters or cast heater members which keep the plastic material in the central flow paths in a molten condition. The heater members are connected by wire leads 50 and 52 to the temperature controller. Conventional thermocouple members (not shown) are also incorporated in each of the bushings 26, 26'. The thermocouplers are connected by wires 51 and 53 to the temperature controller.

An injection molding system of the type described above is marketed by Incoe Corporation, Troy, Mich. under the name "Hot Runner System". Bushings which can be used in such a system are the XRC bushings also available from the Incoe Corporation.

In the inventive power factor correction system 10, as shown in FIG. 2, a power supply 60 is in communication with a sensing device 62. The sensing device 62 monitors the line voltage 64 from the power supply. The sensing device 62 is in communication with a temperature controller 66 which also receives the measured line voltage 64 directly from the power supply 60. The temperature controller 66 is in communication with one or more resistive loads 68, such as the electric heater used to heat the desired locations of the molding system 20 to the predetermined temperature. The resistive loads 68 are in communication with the conventional components of the molding system, such as manifold 24 and bushings 26,26', to increase, decrease or maintain the heat applied thereto. Although the resistive load is preferably an electric heater member, any other suitable apparatus for applying heat to the system components may be utilized. The temperature controller 66 is used because it is relatively repeatable in that it accurately maintains a constant temperature that is based on its input.

The temperature controller 66 monitors the temperatures from the resistive load 68 through thermocouple sensing devices 70. These thermocouple devices 70 can be, for example, the thermocouple members described above with respect to FIG. 1. The temperature controller 66 used with system 20 measures and displays the temperatures of the components (e.g. the manifold and bushings) through which the molten material is passing. These temperatures correspond to the actual temperature of the molten material.

By way of example, to illustrate the operation of the present invention, the temperature controller 66 is connected to a conventional power supply 60 which is supplying a given line voltage 64. In this example, the temperature controller 66 needs to maintain temperatures of 400 degrees Fahrenheit in the manifold 24 and bushings 26,26', and a voltage of 50 volts 72 is needed to be sent to the resistant heaters to reach that temperature level.

The sensing device 62 measures and monitors the line voltage 64. The sensing device 62 can be built onto the temperature controller 66, or can be a separate device that is in communication with the temperature controller. The temperature controller 66 receives the measured line voltage 64 from the sensing device 62 and then compares the measured line voltage with the anticipated line voltage, which in this example is 240 volts. The temperature controller 66 of the present invention may be any commercially available controller that allows for the receipt of temperature data and allows for the control of heat applied to a resistive load. Temperature controllers of this type are commercially available from Incoe Corporation, Troy, Mich.

If the line voltage were to fluctuate or decrease below the expected line voltage, as can happen when other electrical devices are utilizing the same line voltage as the power supply, the sensing device 62 will signal the controller 64 which will maintain the output voltage 72 at a level sufficient to maintain the temperatures produced by the resistive loads 68.

For example, without the invention, if the line voltage output 64 were to drop to 230 volts, the voltage being provided to the temperature controller 66 would be 230 volts. The voltage output 72 from the temperature controller 66 would correspondingly decrease from 50 volts to about 40 volts and the temperature would not be maintained at 400 degrees Fahrenheit in the manifold and bushings.

In the power factor correction system 10, the sensing device 62 will detect the variations in the line voltage from the illustrative 240 volts. Thus, in this example, if the line voltage were to drop to 230 volts, the sensing device 62 will signal the temperature controller 66 of the line voltage drop. The temperature controller 66 in turn will increase the output applied to the resistive load 68 so that it will maintain the necessary 50 volts instead of the 40 volts that would be transmitted based on the line voltage drop. It should be understood that the output 72 from the temperature controller 66 can be either increased or decreased, as needed. It should also be understood that the voltages provided in the example are merely illustrative and will vary depending upon the application.

Without the voltage correction, the output of the controller 66 would have to wait for the input 74 from the thermocouples 70 to register a change in temperature due to the line voltage change before the output 72 would be able to compensate for the line voltage change. Thus, the present invention accommodates for line voltages changes in real time, without the delay encountered by the prior art systems. This is a significant advantage. Since the voltages can change frequently during a 24-hour period and sometimes change drastically. The system of the present invention is also much more stable than the prior thermocouple reliance systems because of the quicker response time.

As is evident, the operation of the present invention senses a line voltage fluxuation and compensates for it faster than simply by the use of thermocouples. This has not been done previously with resistive loads. Because voltage changes at a quicker rate, the thermocouples 70 cannot detect changes as quickly. The present invention allows for utilization and measurement of the power coming in and varying the output power before the thermocouple detects the change and can respond to any fluxations in the incoming power supply.

In an alternative embodiment, the temperature can be controlled and monitored without the use of thermocouples. Thus, for example, if the thermocouples 70 failed, the power correction system 10 disclosed above will compensate by itself for the variances in the supply voltage to the output voltage from the temperature controller, thus allowing the process to continue.

While only one preferred embodiment of the invention has been described hereinabove, those of ordinary skill in the art will recognize that this embodiment may be modified and altered without departing from the central spirit and scope of the invention. Thus, the embodiment described hereinabove is to be considered in all respects as illustrative and not restrictive, the scope of the invention being indicated by the appended claims, rather than by the foregoing descriptions, and all changes which come within the meaning and range of equivalency of the claims are intended to be embraced herein.

What is claimed is:

1. A power factor correction system for a resistive load, comprising:

a power source that is direct communication with conventional power lines having an expected line voltage;

a temperature controller in communication with said power source and being programmed to output a predetermined output signal to the resistive load to charge the resistive load to provide a desired voltage level, said predetermined output signal being at least partially based on said expected line voltage;

a sensing device disposed between said power source and said temperature controller, in order to determine an actual line voltage valve and transmit a signal to said temperature controller representative of a difference between said expected line voltage and said actual line voltage; and compensating means in communication with said temperature controller for adjusting said predetermined output signal based on said difference between said actual line voltage and said actual line voltage; whereby the resistive load output meets said desired level throughout a desired cycle.

2. The power factor correction system as recited in claim 1, wherein the resistive load is at least one heater.

3. The power factor correction system as recited in claim 2, wherein said at least one heater is a coil heater.

4. The power factor correction system as recited in claim 2, wherein said at least one heater is a cast heater.

5. The power factor correction system as recited in claim 2, wherein said at least one heater is utilized in an injection molding machine for applying heat to molten liquid at desired locations therein.

6. The power factor correction system as recited in claim 5, wherein said at least one heater is disposed adjacent a manifold.

7. The power factor correction system as recited in claim 5, wherein said at least one heater is disposed adjacent at least one bushing.

8. The power factor correction system as recited in claim 1, further comprising a thermocouple in electrical communication with the resistive load for sensing an output voltage level emitted therefrom, said thermocouple also in communication with said temperature controller to transmit said sensed output voltage level thereto so that said temperature controller can adjust for any differences between said desired voltage level and said output voltage level.

9. A method for applying consistent heat to a plurality of components of an injection molding machine to maintain the temperature of molten material flowing therethrough within a desired temperature range, comprising:

providing an output voltage from a power source which is representative of the voltage on conventional service lines, said output voltage having an expected value;

determining a desired voltage that is required to be transmitted by a temperature controller to a resistive load to keep said molten material within said desired temperature range, said desired voltage being based at least in part on said expected value of said power source output voltage;

measuring said actual output voltage at a location between said power source and said temperature controller;

comparing said actual output voltage with said expected output voltage to determine if any difference exists between said actual output voltage and said expected output voltage; and compensating for said difference by increasing or decreasing the amount of voltage applied to said resistive load by said temperature controller in proportion to said difference.

10. The method as recited in claim 9 wherein said resistive load is a heater.

11. The method as recited in claim 10 wherein said heater is disposed adjacent a manifold in the injection molding machine.

12. The method as recited in claim 10 wherein said heater is disposed adjacent at least one bushing in the injection molding machine.

13. The method as recited in claim 9 further comprising:

sensing a value of an output from said resistive load;

transmitting said output value to said temperature controller;

comparing said output value with said desired value; and adjusting said voltage value that is transmitted to said resistive load.

14. A power factor correction system for use in connection with an injection molding system, comprising:

an injection molding system including a mold cavity, at least one busing for supplying a molten material to said mold cavity, and a manifold through which said molten material flows prior to passing through said at least one busing;

at least one heater in communication with at least one of said manifold or said at least one bushing for applying heat thereto to heat said molten material to a desired temperature;

a temperature controller in communication with said resistive load for transmitting a voltage signal thereto for controlling the amount of heat applied by said resistive load to said one of said manifold or said at least one bushing;

a power supply in communication with said temperature controller for providing a voltage thereto, which is used to send a signal to said heater representing a predetermined voltage in order that said heater heats said molten material to a desired temperature;

a sensing device in communication with said power supply for measuring said voltage provided by said power supply and comparing it with a value of an expected voltage to determine whether a difference exists between said measure voltage and said expected voltage, said sensing device being disposed between said power supply and said temperature controller such that said difference is transmitted to said sensing device; and a compensating means in said temperature controller for adjusting said voltage signal applied to said resistive load in proportion to the measured difference.

15. The system as recited in claim 14 further comprising a thermocouple in communication with said heater for measuring the amount of heat generated thereby and transmitting said measurement to said temperature controller.

* * * * *

UNITED STATES PATENT AND TRADEMARK OFFICE
CERTIFICATE OF CORRECTION

PATENT NO. : 6,107,610
DATED : August 22, 2000
INVENTOR(S) : John W. Tarr

Page 1 of 1

It is certified that error appears in the above-identified patent and that said Letters Patent is hereby corrected as shown below:

<u>Column 7,</u>
Line 2, "busing" should be -- bushing --
Line 5, "busing" should be -- bushing --

Signed and Sealed this

Twenty-sixth Day of February, 2002

*Attest:*

*Attesting Officer*

JAMES E. ROGAN
*Director of the United States Patent and Trademark Office*